United States Patent

Ishizu

[11] Patent Number: 5,914,985
[45] Date of Patent: Jun. 22, 1999

[54] DIGITAL DEMODULATOR

[75] Inventor: Fumio Ishizu, Tokyo, Japan

[73] Assignee: Mitsubishi Denki Kabushiki Kaisha, Tokyo, Japan

[21] Appl. No.: 08/677,881

[22] Filed: Jul. 10, 1996

[30] Foreign Application Priority Data

Sep. 18, 1995 [JP] Japan .................................... 7-238440

[51] Int. Cl.⁶ ........................... H04L 27/14; H04L 27/16; H04L 27/22
[52] U.S. Cl. ............................................. 375/326; 375/355
[58] Field of Search ................................ 375/261, 325, 375/326, 324, 340, 344, 359, 362, 371, 375, 355; 329/304, 341; 370/516, 517; 348/536, 538; 455/192.1, 192.2; 364/724.1; 327/141

[56] References Cited

U.S. PATENT DOCUMENTS

| 4,121,165 | 10/1978 | Dogliotti et al. . | |
|---|---|---|---|
| 5,260,975 | 11/1993 | Saito . | |
| 5,282,228 | 1/1994 | Scott et al. . | |
| 5,311,545 | 5/1994 | Critchlow . | |
| 5,341,402 | 8/1994 | Matsushita et al. . | |
| 5,376,894 | 12/1994 | Petranovich . | |
| 5,434,889 | 7/1995 | Baier | 375/344 |
| 5,524,127 | 6/1996 | Petranovich | 375/368 |
| 5,535,252 | 7/1996 | Kobayashi | 375/371 |
| 5,563,914 | 10/1996 | Sogabe | 375/326 |
| 5,594,758 | 1/1997 | Petranovich | 375/344 |
| 5,610,949 | 3/1997 | Petranovich . | |
| 5,625,652 | 4/1997 | Petranovich | 375/355 |
| 5,638,406 | 6/1997 | Sogabe | 375/326 |
| 5,661,761 | 8/1997 | Iwamatsu | 375/344 |
| 5,692,015 | 11/1997 | Higashi et al. | 375/340 |

FOREIGN PATENT DOCUMENTS 2135490  9/1994  Canada .

OTHER PUBLICATIONS

Shousei Yoshida, Hideho Tomita "A New Coherent Demodulation Technique for Land–Mobile Satellite Communications" International Mobile Satellite Conference, Ottawa, 1990.

*Primary Examiner*—Wellington Chin
*Assistant Examiner*—Jean B. Corrielus
*Attorney, Agent, or Firm*—Wolf, Greenfield & Sacks, P.C.

[57] ABSTRACT

A digital demodulator capable of a high speed operation. An automatic frequency controller (AFC) estimates a frequency deviation $\Delta\omega$ on the basis of a detected sample signal which is outputted at an oversampling interval by a receiving filter. The AFC can estimate the frequency deviation before a stable operation of a bit timing recovery circuit (BTR). The AFC generates a frequency deviation correcting signal for each decision timing on the basis of the estimated frequency deviation, and decision timing information from the BTR. A multiplier eliminates a frequency deviation component from an input signal in response to the frequency deviation correcting signal.

17 Claims, 7 Drawing Sheets

DIGITAL DEMODULATOR

BACKGROUND OF THE INVENTION

1. Field of the Invention

This invention relates to a digital demodulator for demodulating received signals for satellite communications, land-mobile communications, or land-mobile satellite communications.

2. Description of the Prior Art

Recently, digital demodulators have been developed in order to demodulate digitally modulated signals. Such a digital demodulator demodulates a received signal by subjecting the signal to analog-to-digital conversion, and computer-processing a digitized signal.

One such digital demodulator is described in "A New Coherent Demodulation Technique for Land-Mobile Satellite Communications" (S. Yoshida, H. Tomita, International Mobile Satellite Conference, Ottawa, pp 662–627, 1990).

FIG. 6 is a block diagram showing the configuration of this digital demodulator. The digital demodulator is used to coherently detect a QPSK-modulated signal. An IF (intermediate frequency) signal obtained by frequency-converting a received signal is inputted into the digital demodulator.

Referring to FIG. 6, an analog-to-digital converter 60 (called the "A/D converter 60") directly samples the input IF signal at a high sampling rate which is four times the rate of the IF signal frequency, and digitizes the IF signal. A digital quadrature detector 62 multiplies a sample signal (outputted from the A/D converter 60) by two reference signals, which have a fixed frequency and phases different from each other by $\pi/2$, or subjects the sample signal to the quasi-coherent quadrature detection. The digital quadrature detector 62 samples detected results, and generates an output signal (a detected sample signal) having a bit rate approximately four times the bit rate of the received signal. Thus, the detected sample signal is expressed by:

$$I_{qc}(nT)=I(nT)\cos(\Delta\omega nT+\theta)-Q(nT)\sin(\Delta\omega nT+\theta)$$

$$Q_{qc}(nT)=Q(nT)\cos(\Delta\omega nT+\theta)-I(nT)\sin(\Delta\omega nT+\theta) \quad (1)$$

where $I_{qc}(\ )$ and $Q_{qc}(\ )$ respectively denote in-phase component and quadrature components of the detected sample signal; $I(\ )$ and $Q(\ )$ respectively denote in-phase components and quadrature components of the original digital signal to be transmitted; n is an integer; T denotes an interval between two sample times for the digital quadrature detector 62 to output detected sample signals; $\Delta\omega$ denotes a frequency deviation between a carrier of the received signal and a frequency of the reference signal; and $\theta$ denotes an initial phase of the detected sample signal (i.e. an initial phase of the reference signal with respect to the received carrier). Further, the reference signals used for quasi-coherent detection have sine waves whose frequencies approximate to the frequencies of the carrier, so that the detected sample signal is a baseband signal.

The digital quadrature detector 62 outputs the detected sample signal, as complex data, to a receiving filter 64. The receiving filter 64 shapes a waveform of the detected sample signal, thereby eliminating out-of-band noise components therefrom.

An output signal from the receiving filter 64 is applied to a bit timing recovery (BTR) 66, and to an interpolator 68.

The BTR 66 determines bit timing, i.e. decision timing for deciding a value of the received signal. Information on the determined decision timing is inputted into the interpolator 68. One example of a method of estimating the decision timing by the BTR 66 is also described in the foregoing literature (by Yoshida et al.).

The output signal of the receiving filter 64 is a signal sampled at oversampling timing, which is not always synchronous with the decision timing. Therefore, the interpolator 68 interpolates this output signal, and generates a decision timing signal expressed by:

$$I_N(mT_S)=I(mT_S)\cos(\Delta\omega mT_S+\theta_N)-Q(mT_S)\sin(\Delta\omega mT_S+\theta_N)$$

$$Q_N(mT_S)=Q(mT_S)\cos(\Delta\omega mT_S+\theta_N)+I(mT_S)\sin(\Delta\omega mT_S+\theta_N) \quad (2)$$

where $I_N(\ )$ and $Q_N(\ )$ respectively denote in-phase components and quadrature components of the decision timing signal; $T_S$ denotes an interval between decision times (i.e. Nyquist interval); and $\theta_N$ denotes an initial phase component of the decision timing signal.

The interpolator 68 outputs the foregoing decision timing signal as the complex data at each Nyquist interval. The following circuits operate in response to the decision timing signal. In FIG. 6, a solid line represents a route for signals which vary at each oversampling interval, while a double-solid line represents a route for signals which vary at the decision timing, i.e. vary at the Nyquist intervals.

In the circuits following the interpolator 68, a phase rotation component, which is caused by the frequency deviation ($\Delta\omega$) and the initial phase ($\theta_N$), is eliminated from the decision timing signals $I_N(mT_S)$ and $Q_N(mT_S)$, thereby recovering original digital signals $I(mT_S)$ and $Q(mT_S)$.

First of all, an automatic frequency controller (AFC) 70 estimates a frequency deviation component, and feeds it back to a multiplier 72, which eliminates the frequency deviation component from the decision timing signals $I_N$ and $Q_N$. Then, a phase estimator 74 estimates an initial phase $\theta_N$ on the basis of the decision timing signal whose frequency deviation component has been eliminated, and generates a phase correcting signal on the basis of the initial phase $\theta_N$. The foregoing literature (by Yoshida et al.) describes an example of the internal configuration of the phase estimator 74. A multiplier 76 multiplies the decision timing signal (free from the frequency deviation component) by the phase correcting signal, thereby eliminating the initial phase component from the decision timing signal. An output of the multiplier 76 serves as a coherently detected output for the received signal.

In the digital demodulator of FIG. 6, the AFC and the phase estimator operate in response to the decision timing signal. Therefore, when a burst signal or the like is inputted, neither the AFC nor the phase estimator can operate until the BTR operates stably. In other words, even when the AFC and the phase estimator are operated, no correct output is obtainable before the stable operation of the BTR. In this state, it is meaningless to operate the AFC and so on. In the prior art, the AFC is activated after the stable operation of BTR. The phase estimator is not activated until the AFC operates stably. Therefore, the digital demodulator of the prior art is prone to a problem that it cannot satisfy a request for high speed operation. Further, even when such a digital demodulator becomes stable, malfunction of the BTR would lead to erroneous operation of the phase estimator.

SUMMARY OF THE INVENTION

The present invention is intended to overcome the foregoing problems of the prior art, and to provide a digital demodulator which can operate at a high speed, and is configured so as to protect circuit components against the malfunction of the BTR.

According to a first aspect of the invention, there is provided a digital demodulator for coherently detecting received digitally-modulated signals, which comprises: a quasi-coherent detector for quasi-coherently detecting each received signal on the basis of a predetermined reference signal and outputting a detected sample signal at each sampling timing; a decision timing generator for generating decision timing for the received signal on the basis of the detected sample signal; an interpolator for interpolating the detected sample signal on the basis of information concerning the decision timing, and generating a decision timing signal; a frequency deviation estimator for estimating a frequency deviation between a carrier of the received signal and the reference signal, and generating a frequency deviation correcting signal in each decision timing on the basis of the estimated frequency deviation; a frequency deviation corrector for correcting the decision timing signal, on the basis of the frequency deviation correcting signal; a phase estimator for estimating an initial phase component of an output signal of the frequency deviation corrector and generating a phase correcting signal on the basis of the initial phase component; and a phase corrector for correcting the output signal of the frequency deviation corrector using the phase correcting signal.

In this arrangement, the frequency deviation estimator estimates a frequency deviation of the received signal on the basis of the detected sample signal. The frequency deviation estimator can estimate the frequency deviation before the decision timing generator generates the decision timing, i.e. the frequency deviation is estimated independently of the decision timing generation. This configuration enables the digital demodulator to operate at a high speed, and prevents the frequency deviation estimator from being adversely affected by the malfunction of the decision timing generator.

In accordance with a second aspect of the invention, there is provided a digital demodulator comprising: a quasi-coherent detector for quasi-coherently detecting each received signal on the basis of a predetermined reference signal and outputting a detected sample signal at each sampling timing: a decision timing generator for generating decision timing for the received signal on the basis of the detected sample signal; an interpolator for interpolating the detected sample signal on the basis of information concerning the decision timing, and generating a decision timing signal; a frequency deviation estimator for estimating a frequency deviation between a carrier of the received signal and the reference signal, and generating a first frequency deviation correcting signal for each decision timing and a second frequency deviation correcting signal for each sampling timing, on the basis of the estimated frequency deviation; a first frequency deviation corrector for correcting the decision timing signal on the basis of the first frequency deviation correcting signal; a second frequency deviation corrector for correcting the detected sample signal on the basis of the second frequency deviation correcting signal; a phase estimator for estimating an initial phase component of the detected sample signal on the basis of an output signal of the second frequency deviation corrector, and generating a first phase correcting signal for the sampling timing on the basis of the initial phase component; and a correcting signal modifier for modifying the first phase correcting signal on the basis of the decision timing and the first frequency deviation correcting signal, and generating a second phase correcting signal for the decision timing; and a phase corrector for correcting the output signal of the first frequency deviation corrector on the basis of the second phase correcting signal.

With the digital demodulator, not only the frequency deviation but also the initial phase component are estimated on the basis of the detected sample signal. This further accelerates the operation of the digital demodulator, and prevents the estimation of the initial phase component from being adversely affected by the malfunction of the decision timing generator.

According to a third aspect of the invention, there is provided a digital demodulator comprising: a quasi-coherent detector for quasi-coherently detecting each received signal on the basis of a predetermined reference signal and outputting a detected sample signal at each sampling timing: a decision timing generator for generating decision timing for the received signal on the basis of the detected sample signal; an interpolator for interpolating the detected sample signal on the basis of information concerning the decision timing, and generating a decision timing signal; a delay detector for delay-detecting the decision timing signal; a frequency deviation estimator for estimating a frequency deviation between a carrier of the received signal and the reference signal on the basis of the detected sample signal, and generating a phase rotation correcting signal indicative of an amount of phase rotation per delay time of the delay detector, on the basis of the estimated frequency deviation; and a phase corrector for correcting an output signal of the delay detector on the basis of the phase rotation correcting signal.

In this arrangement, the demodulation is performed by delayed detection. During the demodulation, the frequency deviation estimator estimates the frequency deviation of the received signal on the basis of the detected sample signal. Thus, the frequency deviation estimator can estimate the frequency deviation before the generation of the decision timing by the decision timing generator. The frequency deviation estimation is performed independently of the generation of the decision timing generation. This enables the high speed operation of the digital demodulator, and prevents the frequency deviation estimator from being affected by the malfunction of the decision timing generator.

The invention will become more apparent from the following detailed description of the presently preferred embodiments when taken in conjunction with the accompanying drawings.

DESCRIPTION OF THE PREFERRED EMBODIMENTS

Embodiment 1

Figure 1:
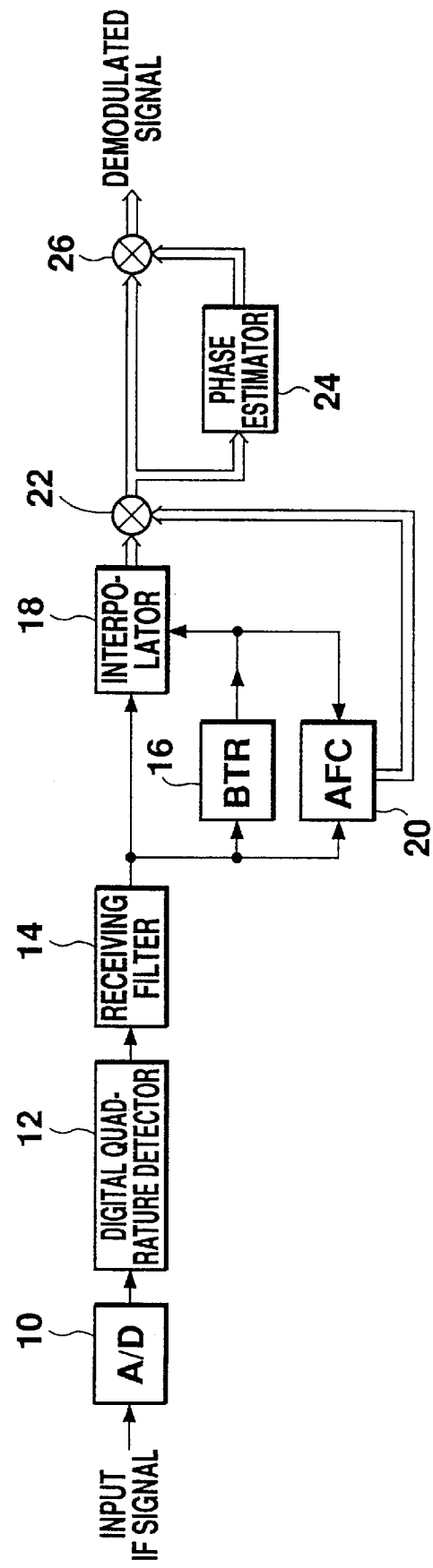
FIG. 1 is a block diagram schematically showing the configuration of a digital demodulator according to a first embodiment of the invention.

According to a first embodiment of the invention, a digital demodulator is configured as shown in FIG. 1, and is applicable to coherent detection of a QPSK-modulated signal. An IF signal (intermediate frequency signal) obtained by frequency-modulating a received signal is inputted to the digital demodulator. In FIGS. 1 to 4, a solid line represents a route for signals which vary at oversampling intervals, while a double solid line represents a route for signals which vary at Nyquist intervals.

Referring to FIG. 1, an analog-to-digital converter 10 (hereinafter called the "A/D converter 10") directly samples an input IF signal at a sampling rate which is four times as fast as a rate of the IF signal, and digitizes the input IF signal. A digital quadrature detector 12 quasi-coherently detects a sample signal from the A/D converter 10, i.e. the sample signal is multiplied by two reference signals which have a fixed frequency, and phases different from each other by $\pi/2$. The digital quadrature detector 12 samples detected results of the high sampling rate or changes high speed clocks to regular speed clocks, and generates an output signal (detected sample signal) whose bit rate is four times as fast as that of the received signal. The detected sample signal is expressed by:

$$I_{QC}(nT)=I(nT)\cos(\Delta\omega nT+\theta)-Q(nT)\sin(\Delta\omega nT+\theta)$$

$$Q_{QC}(nT)=Q(nT)\cos(\Delta\omega nT+\theta)+I(nT)\sin(\Delta\omega nT+\theta) \quad (3)$$

where $I_{QC}(\ )$ and $Q_{QC}(\ )$ respectively denote in-phase components and quadrature components of the detected sample signal; $I(\ )$ and $Q(\ )$ respectively denote in-phase components and quadrature components of the original digital signal to be transmitted; n is an integer; T denotes a sampling interval when the digital quadrature detector generates an output signal; $\Delta\omega$ denotes a frequency deviation between a carrier of the received signal and the frequency of the reference signals; and $\theta$ denotes an initial phase of the detected sample signal (i.e. initial phases of the reference signals with respect to the received carrier). The reference signals are used for the quasi-coherent detection of the digital quadrature detector 12, and have sine waves whose frequencies approximate to the frequencies of the carrier. Thus, the detected sample signal is a baseband signal. The detected sample signal is outputted at the oversampling interval T.

The detected sample signal is inputted to the receiving filter 14, which shapes waveform of the detected sample signal, and eliminates out-of-band noise components therefrom. A Nyquist filter is used as the receiving filter 64.

An output signal of the receiving filter 64 is applied to the bit timing recovery circuit (BTR) 16, interpolator 18, and automatic frequency control (AFC) 20.

The BTR 16 determines, on the basis of the output signal of the receiving filter, bit timing, i.e. decision timing for determining a value of the received signal. The decision timing denotes a time when a signal-to-noise ratio of the received signal is maximum, and an interval between every two sets of decision timing is equal to the Nyquist interval. When a Nyquist filter is used as the receiving filter 14, the decision timing is called a "Nyquist point". When a data value of the received signal is decided at the decision timing, intersymbol interference will be reduced. The decision timing signal is inputted in the interpolator 18 and the AFC 20. One example of the bit timing estimation is also described in the foregoing literature (by Yoshida et al.).

The interpolator 18 interpolates the output signal of the receiving filter 14 at the decision timing, and generates a decision timing signal.

Figure 7:
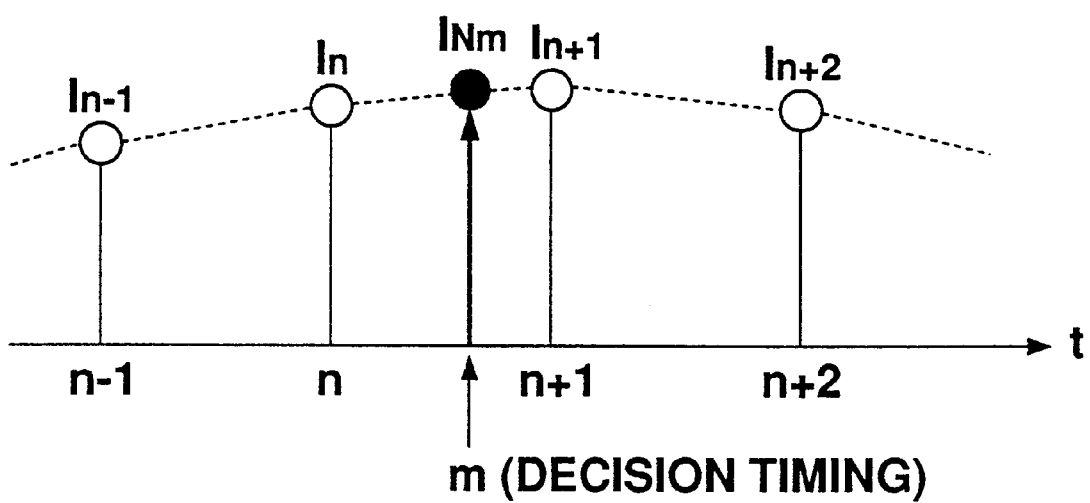
FIG. 7 schematically shows an interpolation process.

The interpolator 18 performs the interpolation as follows. Referring to FIG. 7, the output signal of the digital quadrature detector 12 is sampled at times n−1 to n+2. Data $I_{n-1}$ to $I_{n+2}$ are inputted to the interpolator 18 at sampling intervals. Assume that the BTR 16 extracts the decision timing, and that a decision timing signal is generated at a decision time m. The data at the decision time m is inputted to the interpolator 18, which calculates signal data $I_{Nm}$ (decision timing signal) at the decision time m on the basis of sampling interval data around the decision time m. The decision timing signal can be derived using Lagrange's linear or quadric interpolation technique, for example. Sometimes, a higher degree interpolation technique may be used.

The decision timing signal generated by the interpolator 18 is expressed by:

$$I_N(mT_S)=I(mT_S)\cos(\Delta\omega mT_{S+\theta N})-Q(mT_S)\sin(\Delta\omega mT_{S+\theta N})$$

$$Q_N(mT_S)=Q(mT_S)\cos(\Delta\omega mT_S+\theta_N)-I(mT_S)\sin(\Delta\omega mT_{S+\theta N}) \quad (4)$$

where $I_N(\ )$ and $Q_N(\ )$ respectively denote in-phase components and quadrature components of the decision timing signal; $T_S$ denotes an decision timing interval (i.e. the Nyquist interval); and $\theta_N$ denotes an initial phase component of the decision timing signal. In Equation 4, the initial phase component is expressed by $\theta_N$ (different from $\theta$ in Equation 3) for the following reasons. Since the sampling interval (nT) is not always synchronous with the decision timing ($mT_S$), the start point (n=0) of the sampling interval and the start point (m=0) of the decision timing are different, so that the initial phases are different from each other by an offset amount of these times. For instance, assume that n=0 and m=0 in FIG. 7. It is understood that the standard time 0 (n=0) expressed by Equation 3 for the signal generated at the oversampling interval does not always agree with the standard time 0 (m=0) expressed by Equation 4 for the signals generated at the Nyquist intervals. Both the decision timing signal and the detected sample signal undergo phase rotations in an interval between these standard times, so that the initial phases differ from each other by an amount of the phase rotations. The initial phase $\theta_N$ is equal to the initial phase $\theta$ plus the amount of phase rotations due to the frequency deviation $\Delta\omega$.

At each Nyquist interval, the interpolator 18 outputs the decision timing signal, expressed by Equation 4, which is modified as Equation 5 using the complex notation.

$$R_N(mT_S)=I_N(mT_S)+jQN(mT_S)=\{I(mT_S)+jQ(mT_S)\}\exp\{j(\Delta\omega mT_{S+\zeta_N})\} \quad (5)$$

where $R_N(\ )$ is the decision timing signal denoted by a complex, and j is an imaginary unit.

The AFC 20 estimates the frequency deviation $\Delta\omega$ between a carrier of the received signal and the reference signal on the basis of the detected signal outputted from the filter 14 at the oversampling interval and using a well-known technique. In this embodiment, the frequency deviation $\Delta\omega$ is estimated on the basis of the detected signal outputted at the oversampling interval. This embodiment differs from the digital demodulator of the prior art in this point. The AFC 20 calculates a frequency deviation correcting signal for the decision timing, on the basis of the estimated frequency deviation $\Delta\omega$ and the decision timing information inputted from the BTR 16. The frequency deviation correcting signal $C_{AFC}$ is expressed by:

$$C_{AFC}(mT_S)=\exp(-j\Delta\omega mT_S) \quad (6)$$

The AFC 20 outputs the frequency deviation correcting signal $C_{AFC}$ (Equation 6) at the Nyquist rate. This signal $C_{AFC}$ is inputted in the multiplier 22.

The multiplier 22 complex-multiplies the decision timing signal $R_N$ (from the interpolator 18) by the frequency deviation correcting signal $C_{AFC}$, thereby eliminating the frequency deviation components from the decision timing signal. The multiplier 22 outputs a decision timing signal $R_{AFC}$ free from the frequency deviation component. This signal is expressed by:

$$R_{AFC}(mT_S) = R_N(mT_S) \times \exp(-j\Delta\omega mT_S) = \{I(mT_S) + jQ(mT_S)\} \exp(j\theta_N) \qquad (7)$$

An output signal of the multiplier is applied to both a phase estimator 24 and a multiplier 26.

The phase estimator 24 estimates the initial phase component $\theta_N$ on the basis of the decision timing signal $R_{AFC}$ of the multiplier 22. A circuit shown in the foregoing literature (by Yoshida et al.) may be used as the phase estimator 24. The phase estimator 24 calculates a phase correcting signal $C_{PE}$ expressed by:

$$C_{PE}(mT_S) = \exp(-j\theta_N) \qquad (8)$$

The phase correcting signal $C_{PE}$ is inputted to the multiplier 26. The multiplier 26 complex-multiplies the decision timing signal $R_{AFC}$ (which is outputted by the multiplier 22 and has no frequency deviation component) by the phase correcting signal $C_{PE}$, thereby eliminating the initial phase component from the decision timing signal. Thus, the multiplier 26 outputs a coherently detected signal S expressed by:

$$S(mT_S) = R_{AFC}(mT_S) \times \exp(-j\theta_N) \qquad (9)$$
$$= I(mT_S) + jQ(mT_S)$$

The digital demodulator of this embodiment precisely demodulates the in-phase components I and the quadrature component Q in the original digital signal, as can be seen from Equation 9.

Figure 6:
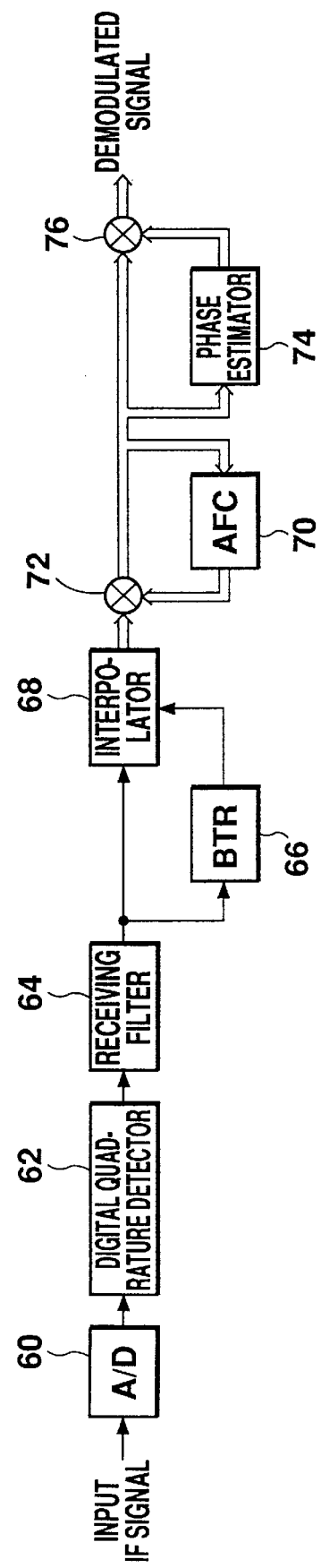
FIG. 6 is a block diagram showing the configuration of a digital demodulator of the prior art.

In this embodiment, the AFC 20 and the BTR 16 operate independently since the AFC 20 derives the frequency deviation $\Delta\omega$ on the basis of the detected sample signal outputted at the oversampling interval from the receiving filter 14. In the prior art demodulator of FIG. 6, the AFC cannot operate until the BTR operates stably. On the other hand, the AFC 20 of this embodiment can operate before the stable operation of the BTR 16. Therefore, the time necessary for the demodulator to become stable can be reduced by a time necessary for the BTR 16 to become stable, which enables the digital demodulator to operate at a high speed overall.

In this embodiment, even when the BTR 16 malfunctions (during the stable operation of the demodulator), the AFC 20 can estimate the frequency deviation $\Delta\omega$ without being affected by the output signal from the BTR 16. Thus, the AFC 20 can output the frequency deviation correcting signal immediately after the BTR 16 resumes its stable operation.

The techniques utilized in this embodiment are applicable to demodulation of not only the QPSK-modulated signals but also signals such as BPSK- or FSK-modulated signals.

Embodiment 2

Figure 2:
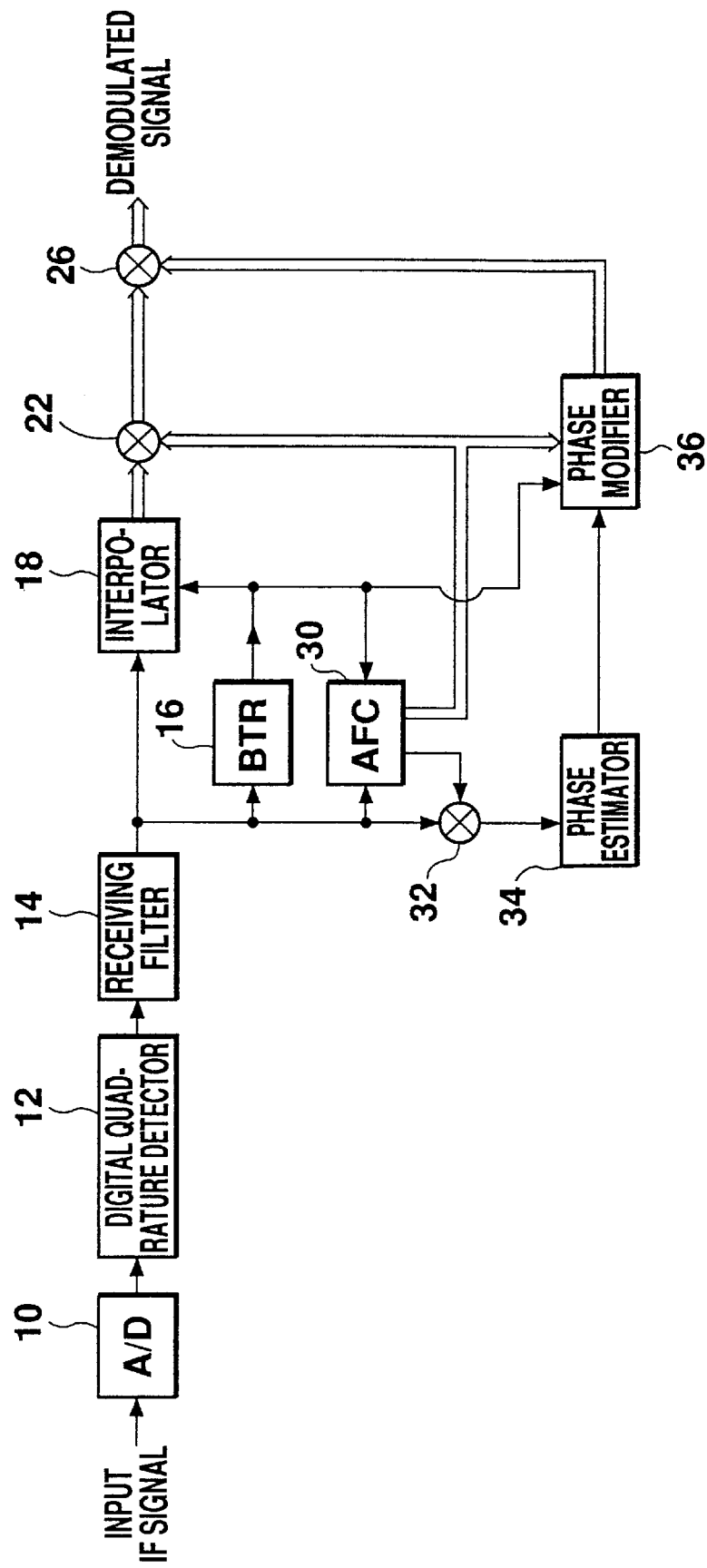
FIG. 2 is a block diagram schematically showing the configuration of a digital demodulator according to a second embodiment of the invention.

FIG. 2 is a block diagram showing the configuration of a digital demodulator according to a second embodiment of the invention. In FIG. 2, the components identical to those of the first embodiment have identical reference numerals, and are not described here.

In the second embodiment, the phase estimator, as well as the AFC, is operated in response to signals generated at the oversampling interval. The demodulator can operate at a higher rate than the demodulator of the first embodiment.

Referring to FIG. 2, the AFC 30 calculates not only a frequency deviation correcting signal for the decision timing signal (generated at the sampling interval) but also a frequency deviation correcting signal for the signal generated by the digital quadrature detector 12 at the sampling interval. In other words, the AFC 30 estimates the frequency deviation $\Delta\omega$ on the basis of the detected sample signal outputted by the receiving filter 14 at the oversampling interval. Further, the AFC 30 calculates the frequency deviation correcting signal $C_{INT}$ (refer to Equation 10) for the signals outputted at the decision timing, and the frequency deviation correcting signal $C_{RX}$ (Equation 11) for the signals outputted at the sampling interval.

$$C_{INT}(mT_s) = \exp(-j\Delta\omega mT_s) \qquad (10)$$

$$C_{RX}(nT) = \exp(-j\Delta\omega mT) \qquad (11)$$

The frequency deviation correcting signal $C_{INT}$ (for correcting the frequency deviation at the decision timing) is inputted to the multiplier 22, while the frequency deviation correcting signal $C_{RX}$ (for correcting the frequency deviation during the sampling interval) is inputted to the multiplier 32.

The multiplier 22 complex-multiplies the decision timing signal $R_N$ (from the interpolator 18) by the frequency deviation correcting signal $C_{INT}$ thereby eliminating the frequency deviation component from the decision timing signal $R_N$. Thus, the multiplier 22 outputs a decision timing signal $X_{INT}$ free from the frequency deviation component. The decision timing signal $X_{INT}$ is expressed by:

$$X_{INT}(mT_s) = R_N(mT_s) \times \exp(-j\Delta\omega mT_s) \qquad (12)$$
$$= \{I(mT_s) + jQ(mT_s)\} \exp(j\theta_N)$$

On the other hand, the multiplier 32 multiplies the detected sample signal (from the receiving filer 14) by the frequency deviation correcting signal $C_{RX}$ so as to eliminate the frequency deviation components from the detected sample signal, thereby outputting a detected sample signal $X_{RX}$ free from the frequency deviation component, expressed by:

$$X_{RX}(nT) = \{I_{QC}(nT) + jQ_{QC}(nT)\} \times C_{RX}(nT) \qquad (13)$$
$$= \{I(nT) + jQ(nT)\} \exp(j\theta)$$

The phase estimator 34 estimates an initial phase component $\theta$ in the detected sample signal on the basis of the detected sample signal $X_{RX}$ (without the frequency deviation component, and outputted at the oversampling interval). In other words, the phase estimator 34 performs the phase estimation on the basis of the signal $X_{RX}$, independently of the output of the BTR 16. Then, the phase estimator 34 calculates a phase correcting signal $C_{PE2}$ on the basis of the estimated initial phase component $\theta$. The phase correcting signal $C_{PE2}$ is expressed by:

$$C_{PE2}(nT) = \exp(-j\theta) \qquad (14)$$

The phase correcting signal $C_{PE2}$ derived by the phase estimator 34 is used to correct the initial phase component $\theta$ at the sampling timing. Therefore, this phase correcting signal $C_{PE2}$ cannot be used to correct the initial phase component $\theta_N$ of the decision timing signal outputted by the multiplier 22. This is because the phase components θ and $θ_N$ are different due to the difference between the start points of the sampling timing and the decision timing.

In the second embodiment, the phase modifier 36 modifies the phase correcting signal $C_{PE2}$ to a value corresponding to that of the signal generated at the decision timing. Specifically, the phase modifier 36 calculates an amount of phase rotation caused by a difference between the start points of the sampling timing and the decision timing, on the basis of the decision timing information from the BTR 16 and the frequency deviation information from the AFC 30. Then, the phase modifier 36 modifies the phase correcting signal $C_{PE2}$ based on the calculated amount of phase rotation, thereby outputting, at the Nyquist rate, a phase correcting signal $C_{PE3}$ for the signals outputted at the decision timing. This signal $C_{PE3}$ is expressed by:

$$C_{PE3}(mT_S)=\exp(-jθ_N) \quad (15)$$

The phase correcting signal $C_{PE3}$ is inputted in the multiplier 26, which multiplies the phase correcting signal $C_{PE3}$ by the decision timing signal $X_{INT}$ (expressed by Equation 12 and free from the frequency deviation component), thereby eliminating the frequency deviation component from the decision timing signal. The multiplier 26 outputs a coherently detected signal S, expressed by:

As can be seen from Equation (9), the digital demodulator of this embodiment demodulates the in-phase component I and the quadrature component Q in the original digital signal.

In this embodiment, not only the AFC 30 but also the phase estimator 34 operate in response to the detected sample signals generated at the oversampling interval, independently of the operation of the BTR 16. Thus, both the AFC 30 and the phase estimator 34 can operate before the stabilization of the BTR 16, so that the digital demodulator stably operates in a shorter time than the digital demodulator of the first embodiment.

Even when the BTR 16 malfunctions during the stable operation of the digital demodulator, both the AFC 30 and the phase estimator 34 can estimate the frequency deviation Δω and the initial phase component θ, independently of the output signal from the BTR 16. Therefore, the AFC 30 and the phase estimator 34 precisely output the frequency deviation correcting signal and the phase correcting signal, respectively, immediately after the stabilization of the BTR 16.

The technique utilized in this embodiment is applicable to the demodulation of not only the QPSK-modulated signals but also signals such as BPSK- or FSK-modulated signals.

Embodiment 3

In a third embodiment, a digital demodulator operates on a differential detection system, and is applicable to the demodulation of phase-modulated signals.

Figure 3:
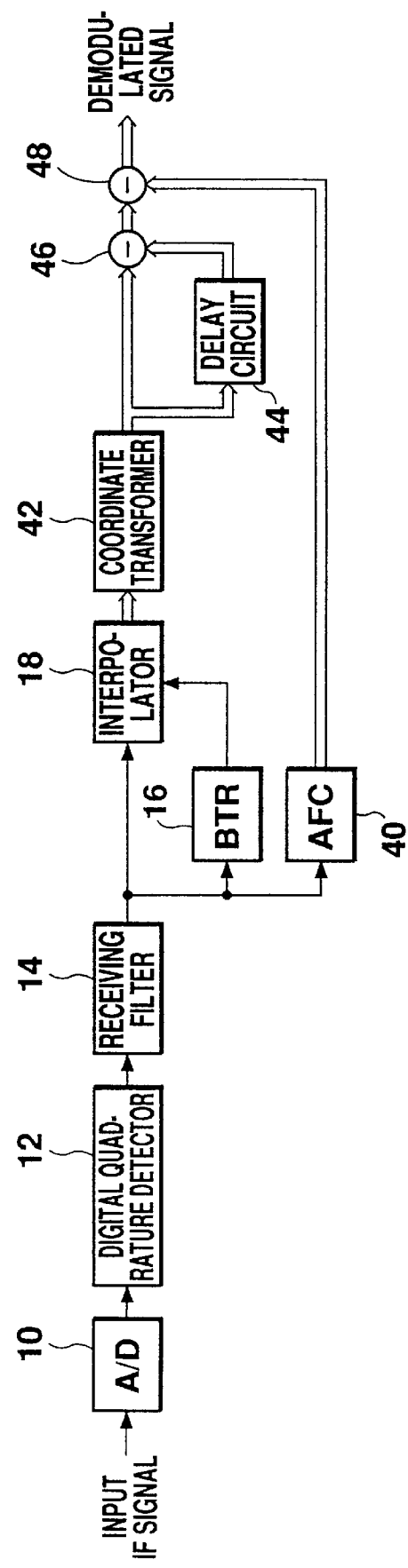
FIG. 3 is a block diagram schematically showing the configuration of a digital demodulator according to a third embodiment of the invention.

This digital demodulator is configured as shown in FIG. 3, in which the components identical to those of the first embodiment are assigned by identical reference numerals, and will be not described here.

The operation of the components between the A/D converter 10 and the interpolator 18 is the same as that of the first embodiment. In this embodiment, phase information is extracted from the decision timing signal outputted by the interpolator 18, thereby performing the delay detection on the basis of the phase information.

A coordinate transformer 42 transforms the decision timing signal (expressed by Equation 5), outputted by the interpolator 18, into the form of polar coordinates, and determines a phase of the decision timing signal. The phase $R_P$ of the decision timing signal is expressed by:

$$R_P(mT_S)=ΔωmT_S+θ_N+θ_M(mT_S) \quad (17)$$

where $θ_M$ ($mT_s$) is a phase component resulting from the modulation, and expressed by:

$$θ_M(mT_S)=\arg\{I(mT_S)+jQ(mT_s)\} \quad (18)$$

An output signal of the coordinate transformer 42 is inputted in a delay circuit 44 and a subtractor 46. The delay circuit 44 delays a phase signal $R_P$ (outputted by the coordinate transformer 42) by one symbol interval (i.e. one Nyquist interval). In order to perform the differential detection, the subtractor 46 subtracts the phase signal $R_P$ ((m−1)$T_S$), which is delayed by one symbol period, from the phase signal $R_P(mT_S)$ of the coordinate transformer 42. The subtractor outputs a differential-detected result signal DD($mT_S$), which is expressed by:

$$\begin{aligned}DD(mT_s) &= R_p(mT_s) - R_p((m-1)T_s) \\ &= θ_M(mT_s) - θ_M((m-1)T_s) + ΔωT_s\end{aligned} \quad (19)$$

As can be seen from Equation 19, the differential-detected result signal DD contains a phase rotation component $ΔωT_S$ caused by the frequency deviation as well as the phase component caused by the modulation. Unless the phase rotation component $ΔωT_S$ is eliminated, error rate characteristics will be degraded.

In order to overcome the foregoing problem, the AFC 40 calculates the phase rotation component $ΔωT_S$, and the subtractor 48 subtracts the phase rotation component $ΔωT_s$ from the differential-detected result signal DD. In other words, the AFC 40 estimates the frequency deviation Δω on the basis of the detected sample signal, which is outputted by the receiving filter 14 at the oversampling interval. Then, the AFC 40 calculates a phase rotation $D_{AFC}$ per symbol interval (i.e. the Nyquist interval) $T_S$.

$$D_{AFC}(mT_S)=ΔωT_S \quad (20)$$

The value of one symbol interval $T_S$ is substantially well-known, because $T_S$ is approximately integer times as large as the oversampling interval T. The AFC 40 stores a value, which is determined by an oversampling clock, as a fixed value of the symbol interval $T_S$, so that the phase rotation $D_{AFC}$ can be precisely drived (at a practically usable level) by applying the fixed value to the Equation 20. In order to derive the phase rotation $D_{AFC}$ more precisely, this embodiment may be configured such that a more precise symbol interval $T_S$ derived by the BTR 16 is applied to the AFC 40.

The differential-detected result containing only a modulated phase component can be obtained when the subtractor 48 subtracts the phase rotation $D_{AFC}$ from the differential-detected result signal DD of the subtractor 46. An output signal $S_{DE}$ of the subtractor 48 is expressed by:

$$S_{DE}(mT_S)=DD(mT_S)-D_{AFC}(mT_S)=θ_M(mT_S)-θ_M((m-1)T_S) \quad (21)$$

As can be seen from Equation 21, the output signal $S_{DE}$ of the subtractor 48 precisely corresponds to a difference between $θ_M(mT_S)$ and $θ_M((m-1)T_S)$ caused by the phase modulation.

In this embodiment, the AFC 40 operates independently of the BTR 16, i.e. the AFC 40 can operate before the stable operation of the BTR 16. The differential-detection demodulator can operate at a high speed in this embodiment Further, the AFC 40 can estimate the frequency deviation Δω regardless of the output signal from the BTR 16 even when the BTR 16 malfunctions during the stable operation of the digital demodulator. Thus, the AFC 40 can output a precise signal indicative of the phase rotation as soon as the BTR 16 resumes its stable operation, which enables the whole demodulator to return to its stable state.

The amount of differential detection is one symbol interval in the foregoing description. Alternatively, it may be several symbol intervals.

The differential detection may be performed by another technique such as complex multiplication in place of the phase subtraction in this embodiment. The phase detection using the complex multiplication will be performed as follows:

In this differential detection, the output signals of the interpolator are delayed, i.e. a current output signal and an output signal of a prior symbol interval are subjected to the complex multiplication. In this case, a differential-detected result signal DD(m) is expressed as follows, when the interpolator outputs a signal S(m) at a time m.

$$DD(m)=S(m) \times S^*(m-1) \qquad (22)$$

where $S^*(m-1)$ is a complex conjugate signal of the output signal $S(m)$ at a time $m-1$. $S(m)$ and $S(m-1)$ are expressed by:

$$S(m)=A(m)\exp\{j\theta(n)\} S(m-1)=A(m-1)\exp\{j\theta(n-1)\} \qquad (23)$$

where $A(m)$ is an amplitude component of the output signal $S(m)$, and $\theta(m)$ is a phase component of the output signal $S(m)$. The differential-detected result signal DD(m) is rearranged by:

$$DD(m) = A(m)\exp\{j\theta(n)\} \times A(m-1)\exp\{-j\theta(n-1)\} \qquad (24)$$
$$= A(m)A(m-1)\{j(\theta(m)-\theta(m-1))\}$$

It is understood that the phase difference which is caused during one symbol interval can be derived by the complex multiplication. Thus, a demodulated signal can be obtained by eliminating the frequency deviation component from the phase difference component.

Embodiment 4

Figure 4:
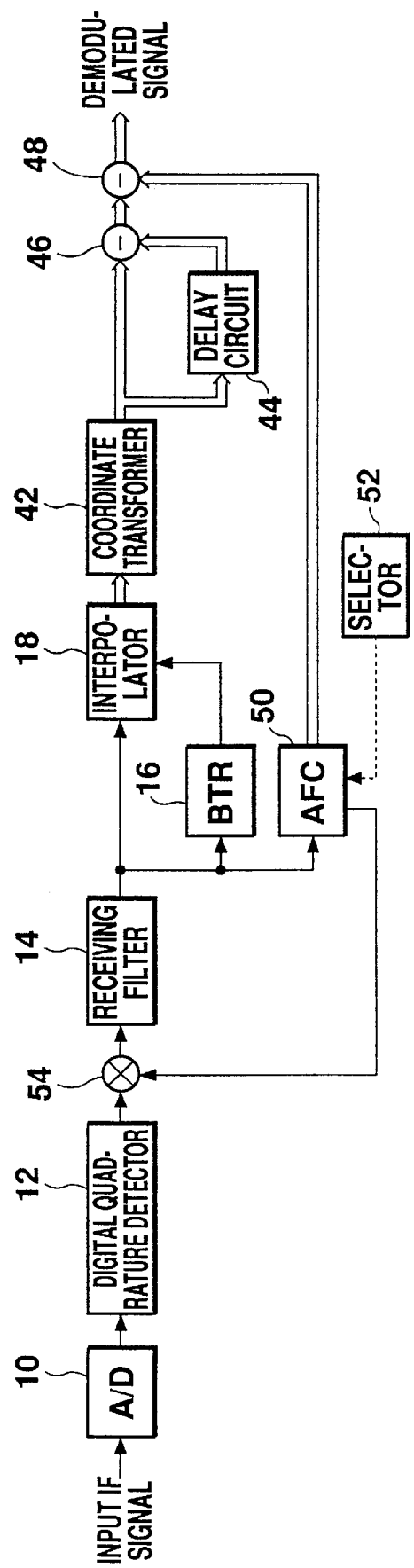
FIG. 4 is a block diagram schematically showing the configuration of a digital demodulator according to a fourth embodiment of the invention.

FIG. 4 is a block diagram schematically showing the configuration of a digital demodulator according to a fourth embodiment of the invention. In FIG. 4, components identical to those in the third embodiment are assigned identical reference numerals, and will not be described here.

The digital demodulator is a modification of the digital demodulator of the third embodiment, and is intended to accelerate the stabilization of the circuit operation when a signal is received at an initial operation stage, and reliably process the frequency deviation during the stable operation.

Referring to FIG. 4, the AFC 50 estimates a frequency deviation Δω on the basis of a detected sample signal which is outputted at the oversampling interval by the receiving filter 14. In response to a selection signal from a selector 52, the AFC 50 calculates either the correction signal $D_{AFC}$ (i.e. the phase rotation signal $D_{AFC}$ expressed by Equation 20) for the subtractor 48 or a correction signal $C_{RX}(nT)=\exp(-j\Delta\omega nT)$ for a multiplier 54. Specifically, the AFC 50 calculates the correction signal $D_{AFC}$, and supplies it to the subtractor 48 when the operation of the digital demodulator should be quickly stabilized. On the other hand, the AFC 50 calculates the correction signal $C_{RX}$ and provides it to the multiplier 54 during the stable operation of the digital demodulator.

The multiplier 54 is present between the digital quadrature detector 12 and the receiving filer 14. The correction signal $C_{RX}$ is fed back to the multiplier 54, which eliminates the phase rotation component (which is caused by the frequency deviation Δω) from the detected sample signal. A received signal containing a large frequency deviation tends to have a broad frequency band. In such a case, if the frequency deviation is not eliminated, the receiving filter 14 may filter a modulating signal component. However, if the correction signal $C_{RX}$ is fed back to the multiplier 54, the frequency deviation component can be eliminated before the signal is applied to the receiving filter 14. Thus, it is possible to prevent the modulating signal component from being deleted. On the other hand, if the correction signal $C_{RX}$ is fed back to the multiplier 54 immediately before the received signal is applied to the receiving filter 14, it is difficult to quickly stabilize the AFC loop because of time needed for the receiving filter 14 to become stable. Thus, the digital demodulator is not supposed to operate at a high speed.

This circuit configuration enables the digital demodulator to quickly become active and stable, and to process a burst signal or the like which is inputted at the initial operation stage. In such a case, the digital demodulator can correct the frequency deviation after the delay detection as in the third embodiment. Further, once the digital demodulator operates stably, the frequency deviation should be further quickly corrected. This can be performed before the received signal is applied to the receiving filter 14. Thus, even when the received signal contains a large frequency deviation, it is possible to prevent the elimination of the modulating signal component, through the elimination of the frequency deviation on the basis of the correction signal $C_{RX}$ before the received signal is applied to the receiving filter 14. This technique is also applicable to the digital demodulator of the first and second embodiments.

In this embodiment, the digital demodulator can demodulate the received signal appropriately in accordance with a received state of the signal. Specifically, the digital demodulator selects a mode in which the digital demodulator operates at a high speed but the received signal is somewhat degraded by the receiving filter, or a mode in which the digital demodulator operates at a low speed but the received signal is not degraded extensively by the receiving filter. For instance, the operation of the demodulator can be quickly stabilized so as to receive the signal at its initial operation stage, and then process the frequency deviation extensively in its stable operation stage.

Figure 5:
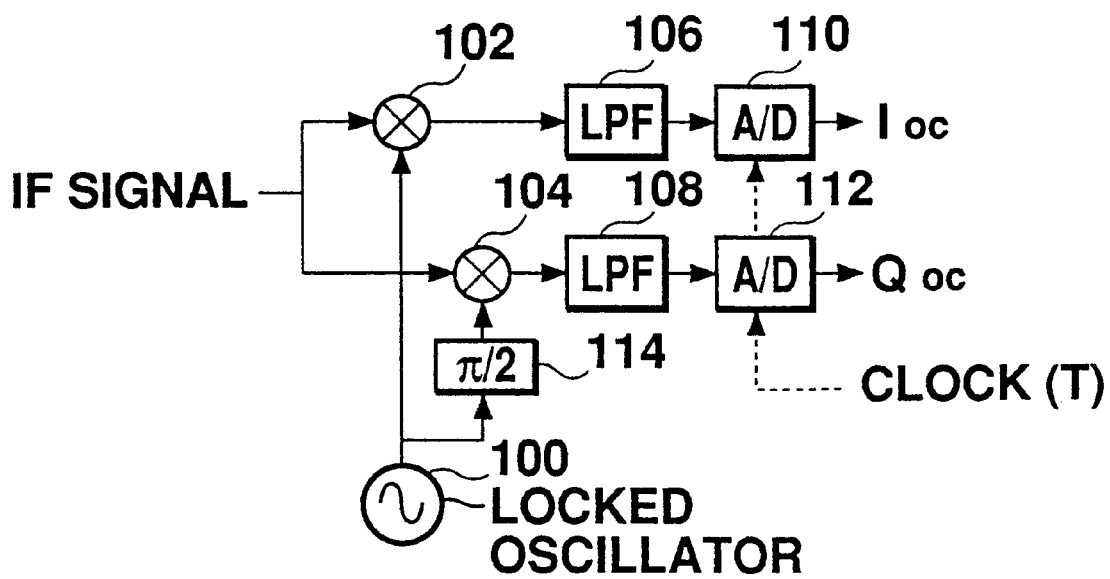
FIG. 5 is a block diagram showing the configuration of a digital demodulator for performing quasi-coherent quadrature detection.

In the foregoing embodiments, the input IF signals are subject to the analog-to-digital conversion, and then to the digital, coherent and quadrature detection. The coherent detection can be performed using another configuration in place of the foregoing configurations. For instance, an input IF signal may be subject to analogous, coherent and quadrature detection, and a detected signal is subject to the analog-to-digital conversion, as shown in FIG. 5. Referring to FIG. 5, the input IF signal is coherently detected by multipliers 102 and 104 on the basis of reference signals which are an output signal of a locked oscillator 100 and a signal obtained by phase-shifting the output signal by a π/2 phase shifter 114, respectively. The detected signal is waveform-shaped by lowpass filters (LPF) 106 and 108, and is subject to the analog-to-digital conversion by A/D converters 110 and 112.

The A/D converters 110 and 112 output detected sample signals $I_{QC}$ and $Q_{QC}$ in response to clock signals which have been outputted at the oversampling interval T and inputted in these A/D converters 110 and 112. The oversampling interval T is equal to the timing at which the digital quadrature detector 12 outputs the signals in the foregoing embodiments. The detected sample signal is equivalent to the signal outputted by the digital quadrature detector 12. The digital demodulator demodulates the received signal on the basis of the detected sample signal.

What is claimed is:

1. A digital demodulator for coherently detecting received digitally-modulated signals, comprising:
   (a) a quasi-coherent detector for quasi-coherently detecting each received signal on the basis of a reference signal and outputting a detected sample signal at each sampling timing;
   (b) a decision timing generator for generating decision timing for said each received signal on the basis of the detected sample signal;
   (c) an interpolator for interpolating the detected sample signal on the basis of information concerning the decision timing, and generating a decision timing signal;
   (d) a frequency deviation estimator for estimating a frequency deviation between a carrier of said each received signal and the reference signal based on the detected sample signal received from the quasi-coherent detector, and generating a frequency deviation correcting signal for each decision timing received from the decision timing generator on the basis of the estimated frequency deviation;
   (e) a frequency deviation corrector for correcting the decision timing signal, on the basis of the frequency deviation correcting signal;
   (f) a phase estimator for estimating an initial phase component of an output signal of the frequency deviation corrector and generating a phase correcting signal on the basis of the initial phase component; and
   (g) a phase corrector for correcting the output signal of the frequency deviation corrector using the phase correcting signal.

2. The digital demodulator according to claim 1, wherein the quasi-coherent detector includes:
   an analog-to-digital converter for converting said each received signal into a digital signal;
   a digital quadrature detector for quasi-coherently and quadraturally detecting an output signal of the analog-to-digital converter on the basis of two reference signals whose phases differ from each other by $\pi/2$; and
   a receiving filter for filtering an output signal of the digital quadrature detector.

3. The digital demodulator according to claim 2, wherein the receiving filter is a Nyquist filter.

4. The digital demodulator according to claim 1, wherein the reference signal has a frequency substantially equal to a carrier frequency of said each received signal.

5. A digital demodulator for coherently detecting received digitally-modulated signals, comprising:
   (a) a quasi-coherent detector for quasi-coherently detecting each received signal on the basis of a reference signal and outputting a detected sample signal at each sampling timing;
   (b) a decision timing generator for generating decision timing for said each received signal on the basis of the detected sample signal;
   (c) an interpolator for interpolating the detected sample signal on the basis of information concerning the decision timing, and generating a decision timing signal;
   (d) a frequency deviation estimator for estimating a frequency deviation between a carrier of said each received signal and the reference signal based on the detected sample signal received from the quasi-coherent detector, and generating a first frequency deviation correcting signal for each decision timing received from the decision timing generator and a second frequency deviation correcting signal for each sampling timing, on the basis of the estimated frequency deviation;
   (e) a first frequency deviation corrector for correcting the decision timing signal on the basis of the first frequency deviation correcting signal;
   (f) a second frequency deviation corrector for correcting the detected sample signal on the basis of the second frequency deviation correcting signal;
   (g) a phase estimator for estimating an initial phase component of the detected sample signal on the basis of an output signal of the second frequency deviation corrector, and generating a first phase correcting signal for the sampling timing on the basis of the initial phase component;
   (h) a correcting signal modifier for modifying the first phase correcting signal on the basis of the decision timing and the first frequency deviation correcting signal, and generating a second phase correcting signal for the decision timing; and
   (i) a phase corrector for correcting the output signal of the first frequency deviation corrector on the basis of the second phase correcting signal.

6. The digital demodulator according to claim 5, wherein the quasi-coherent detector includes:
   an analog-to-digital converter for converting said each received signal into a digital signal;
   a digital quadrature detector for quasi-coherently and quadraturally detecting an output signal of the analog-to-digital converter using two reference signals whose phases differ from each other by $\pi/2$; and
   a receiving filter for filtering an output signal of the digital quadtrature detector.

7. The digital demodulator according to claim 6, wherein the receiving filter is a Nyquist filter.

8. The digital demodulator according to claim 5, wherein the reference signal has a frequency substantially equal to a carrier frequency of said each received signal.

9. A digital demodulator for coherently detecting received digitally-modulated signals, comprising:
   (a) a quasi-coherent detector for quasi-coherently detecting each received signal on the basis of a reference signal and outputting a detected sample signal at each sampling timing;
   (b) a decision timing generator for generating decision timing for said each received signal on the basis of the detected sample signal;
   (c) an interpolator for interpolating the detected sample signal on the basis of information concerning the decision timing, and generating a decision timing signal;
   (d) a differential detector for differential-detecting the decision timing signal;
   (e) a frequency deviation estimator for estimating a frequency deviation between a carrier of said each received signal and the reference signal on the basis of the detected sample signal, and generating a phase rotation correcting signal indicative of an amount of phase rotation per delay time of the differential detector, on the basis of the estimated frequency deviation; and (f) a phase corrector for correcting an output signal of the differential detector on the basis of the phase rotation correcting signal.

10. The digital demodulator according to claim 9, wherein the delay detector includes:

a phase calculator for calculating a phase component of the decision timing signal, and outputting a phase signal;

a delay circuit for delaying the phase signal by the delay time; and a subtractor for subtracting the phase signal delayed by the delay circuit from the phase signal of the phase calculator.

11. The digital demodulator according to claim 10, wherein the phase calculator comprises a coordinate transformer for transforming the decision timing signal into the form of polar coordinates.

12. The digital demodulator according to claim 9, wherein the delay detector complex-multiplies the decision timing signal of the interpolator by the decision timing signal delayed by the delay time.

13. The digital demodulator according to claim 9, wherein the frequency deviation, estimator generates a frequency deviation correcting signal for said each sampling timing on the basis of the estimated frequency deviation, the quasi-coherent detector includes a frequency deviation corrector for correcting the detected sample signal on the basis of the frequency deviation correcting signal, and the digital demodulator further comprises a selector for selecting either the phase rotation correcting signal or the frequency deviation correcting signal of the frequency deviation estimator.

14. The digital demodulator according to claim 13, wherein the selector selects the phase rotation correcting signal when the digital demodulator operates at a high speed, and selects the frequency deviation correcting signal when the digital demodulator operates at an ordinary speed.

15. The digital demodulator according to claim 9, wherein the quasi-coherent detector includes:

an analog-to-digital converter for converting said each received signal into a digital signal;

a digital quadrature detector for quasi-coherently and quadratually detecting an output signal of the analog-to-digital converter on the basis of two reference signals whose phases differ from each other by $\pi/2$; and a receiving filter for filtering an output signal of the digital quadrature detector.

16. The digital demodulator according to claim 15, wherein the receiving filter is a Nyquist filter.

17. The digital demodulator according to claim 9, wherein the reference signal has a frequency substantially equal to a carrier frequency of said each received signal.

* * * * *